United States Patent [19]

Juri et al.

[11] Patent Number: 4,868,654
[45] Date of Patent: Sep. 19, 1989

[54] SUB-NYQUIST SAMPLING ENCODER AND DECODER OF A VIDEO SYSTEM

[75] Inventors: Tatsuro Juri, Ibaraki; Minoru Etoh, Katano, both of Japan

[73] Assignee: Matsushita Electric Industrial Co., Ltd., Kadoma, Japan

[21] Appl. No.: 161,928

[22] Filed: Feb. 29, 1988

[30] Foreign Application Priority Data

Mar. 3, 1987 [JP] Japan .................................. 62-48127

[51] Int. Cl.$^4$ ............................................. H04N 7/04
[52] U.S. Cl. ..................................... 358/133; 358/13; 358/138; 358/141
[58] Field of Search ............... 358/138, 133, 135, 141, 358/12, 13; 340/728

[56] References Cited

U.S. PATENT DOCUMENTS 4,323,976  4/1982  Dischert et al. ................. 358/138 X
4,605,963  8/1986  Reitmeier et al. ............... 358/138 X
4,716,453 12/1987  Pawelski ......................... 358/133 X Primary Examiner—James J. Groody
Assistant Examiner—Victor R. Kostak
Attorney, Agent, or Firm—Spencer & Frank

[57] ABSTRACT

A sub-Nyquist sampling encoder and decoder has a plurality of interpolators provided in an encoder and corresponding plural interpolators provided in a decoder. Information indicating which interpolator can be used to minimize the interpolation error is superimposed on a value of a non-thinned-out pixel and transmitted from the encoder to the decoder, and the decoder receiving the information is permitted to always perform optimum interpolation. The interpolation information is superimposed on the least significant bit of the value of the non-thinned-out pixel, with the view of effecting the superimposition without increasing the amount of transmission data and without degrading quality of the video signal.

17 Claims, 6 Drawing Sheets

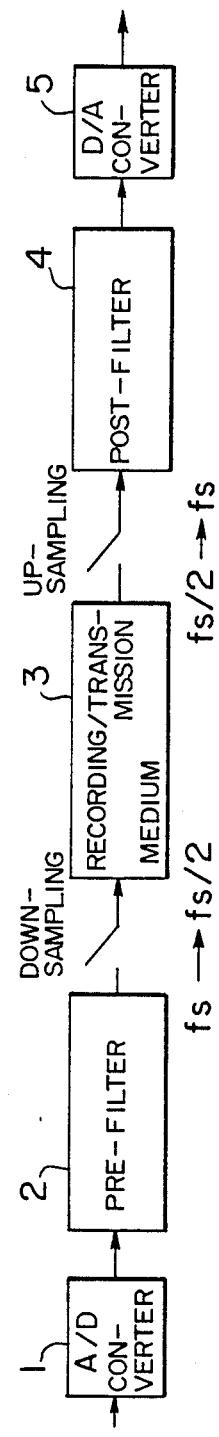
FIG. 1
PRIOR ART
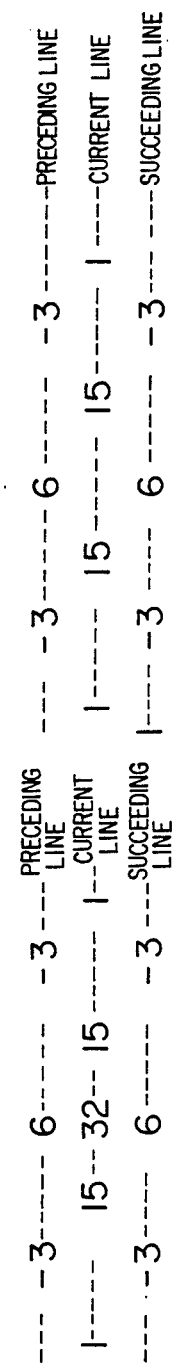
FIG. 3A
PRIOR ART
PRE-FILTER 1/64
FIG. 3B
PRIOR ART
POST-FILTER 1/32

H.P.F.

SUB-NYQUIST SAMPLING ENCODER AND DECODER OF A VIDEO SYSTEM

BACKGROUND OF THE INVENTION

1. Field of the Invention

This invention relates to a sub-Nyquist sampling encoder and decoder used for a transmission/recording apparatus of digitalized video signals such as a digital VTR.

2. Description of the Related Art

A typical example of a conventional sub-Nyquist sampling encoder and decoder will first be described with reference to FIGS. 1, 2, 3A and 3B. Referring to FIG. 1, a recording/transmission system based on sub-Nyquist sampling comprises an A/D converter 1 for sampling an analog pixel signal at a frequency fs, a pre-filter 2 for band width limitation of a spatial frequency of the video signal, a recording/transmission medium 3, a post-filter 4 for interpolating thinned-out pixels, and a D/A converter 5 for converting a sampled pixel string into an analog video signal. Pixels sampled by the A/D converter 1 are patterned into a lattice configuration on the screen, as shown in FIG. 2, and the number of pixels is halved by a thin-out operation. The thin-out operation is described as down-sampling in FIG. 1 and carried out to thin out pixels as depicted by a smaller hatched circle from the sampled pixels in FIG. 2, leaving behind pixels as depicted by a larger blank circle. The down-sampling for an upper line is offset, as illustrated, from that for a lower line with the view of conserving horizontal resolution and vertical resolution in the horizontally and vertically defined two-dimensional frequency space of the video signal before and after the down-sampling. In order to minimize interpolation errors as a whole, it is necessary to effect the band width limitation by means of the pre-filter in advance of the down-sampling operation. The pre-filter 2 in the FIG. 1 example has a filter characteristic as shown in FIG. 3A by which a stringent band width limitation is imposed on frequency components in the skewed direction. The pixel string is passed through the transmission/recording medium at a clock rate of ½ fs and then filled, at pixel positions which are scheduled to be interpolated, with pixels of zero value. This operation is called up-sampling and allows the pixel string to match the clock rate fs. The post-filter acts on the resulting pixel string to perform interpolation. The post-filter 4 in the FIG. 1 example has a filter characteristic as shown in FIG. 3B and functions as a two-dimensional low-pass filter having values used as interpolation values.

The pixel string thus interpolated at the post-filter is passed through the D/A converter 5 and delivered out.

In the conventional construction as above, however, the band width limitation imposed by the pre-filter 2 and post-filter 4 is not sufficiently stringent and accordingly the horizontal resolution and vertical resolution are disadvantageously degraded.

In order to make ideal the transfer characteristics of the pre-filter and post-filter, it is conceivable to increase the degree of these filters but this expedient is expected to lead to a increase in circuit scale and an increase in cost.

SUMMARY OF THE INVENTION

An object of this invention is to provide an apparatus for sub-Nyquist sampling recording/transmission of video signals which can suppress the degradation of resolution to a minimum by using a simplified filter configuration without resort to redundant data.

According to the present invention, a sub-Nyquist sampling encoder and decoder comprises a plurality of different interpolation means which are switched adaptively for individual interpolated pixels (pixels subject to interpolation) so as to perform sub-Nyquist sampling decoding. Selection of one of the plurality of interpolation means is not effected in the course of decoding but is done by predicting, in a sub-Nyquist sampling encoder, the difference between a true value possessed by an interpolated pixel before it is thinned out and an interpolation value to be calculated during decoding. In addition, no redundant bit is added to transmission pixel data so as to obtain information necessary for designating interpolation means selected for each interpolated pixel but otherwise the information is prepared and superimposed on the transmission pixel data in the sub-Nyquist sampling encoder by operating the transmission pixel value when necessary, and the information superimposed on the transmission pixel value is separated therefrom and used to decide proper interpolation means in a sub-Nyquist sampling decoder.

BRIEF DESCRIPTION OF THE DRAWINGS

FIG. 1 is a conceptional diagram illustrating a conventional typical sub-Nyquist sampling encoder and decoder.

FIGS. 3A and 3B respectively show filter characteristics of pre-filter and post-filter exemplarily used in conventional sub-Nyquist sampling coding and decoding.

DESCRIPTION OF THE PREFERRED EMBODIMENTS

Figure 4:
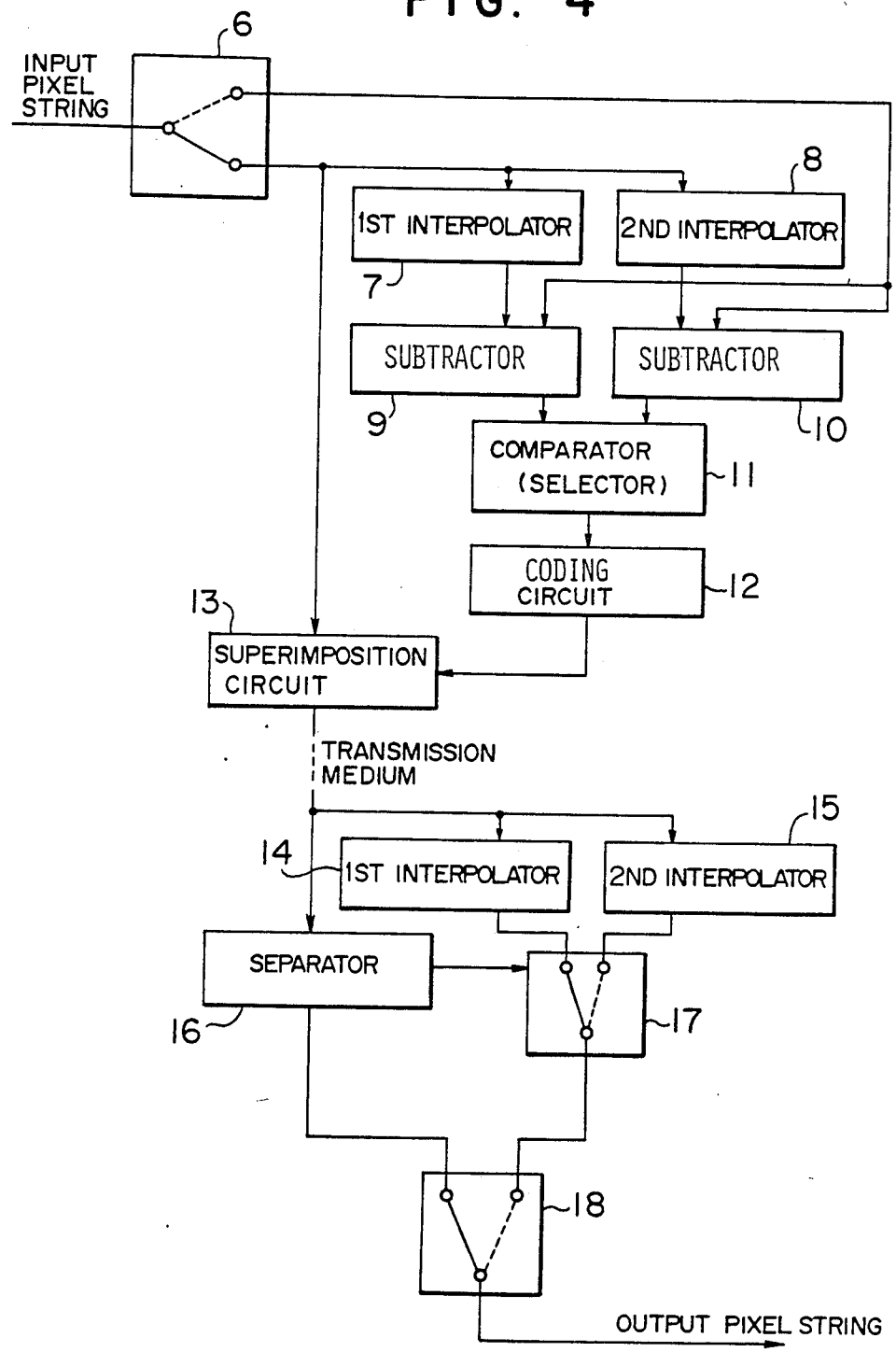
FIG. 4 is a block diagram illustrating a sub-Nyquist sampling encoder and decoder according to a first embodiment of the invention.

Referring now to FIG. 4, there is illustrated, in block diagram form, a sub-Nyquist sampling encoder and decoder according to a first embodiment of the invention. The input signal is a sampled video signal. The sub-Nyquist sampling encoder and decoder shown in FIG. 4 comprises a thin-out circuit 6 for separating an input pixel string into pixels to be thinned out and pixels not to be thinned out, first interpolators 7 and 14 having the same characteristic, second interpolators 8 and 15 having the same characteristic, a subtractor 9 for calculating the difference between an interpolation value obtained from the interpolator 7 and a value of a thinned-out pixel, a subtractor 10 for calculating the difference between an interpolation value obtained from the interpolator 8 and the value of the thinned-out pixel, a comparator (selector) 11 for detecting the difference in magnitude between output signals of the subtractors 9 and 10, a coding circuit 12 responsive to an output signal of the comparator 11 to code it into a coded word for interpolation means, a superimposition circuit 13 for superimposing the output signal of the coding circuit 12 on a non-thinned-out pixel, a separator 16 for separating the superimposed coded word for interpolation means from the transmitted non-thinned-out pixel, a switching circuit 17 responsive to the coded word for interpolation means from the separator 16 to select one of output signals of the interpolators 14 and 15, and an insertion circuit 18 for inserting the interpolation value obtained from the switching circuit 17 into a non-thinned-out pixel string.

Figure 2:
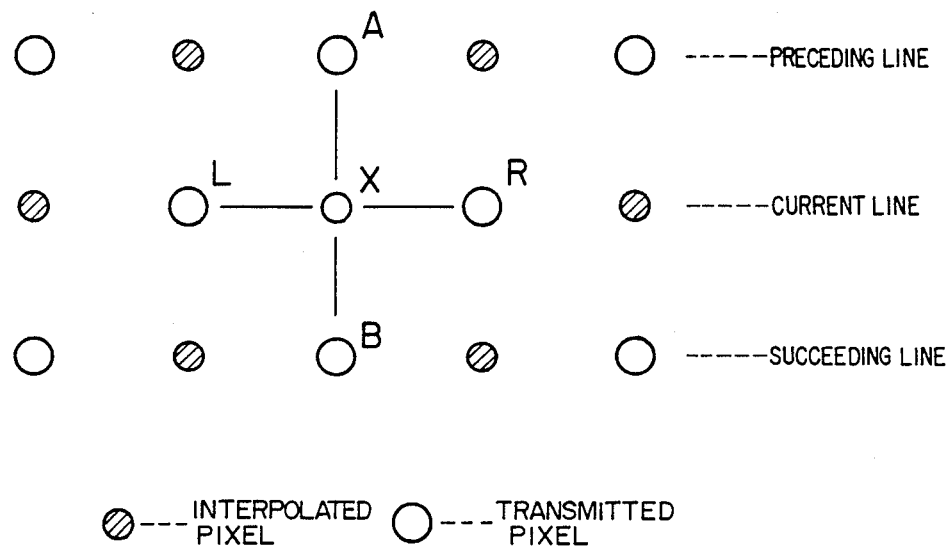
FIG. 2 is a diagram for explaining a sampled pixel pattern in the conventional sub-Nyquist coding.

In this embodiment, two sets of interpolation means are used and two interpolators in each set are switched adaptively. The input pixel string is separated by the thin-out circuit 6 into thinned-out pixels and non-thinned-out pixels, in the same manner as illustrated in FIG. 2. Subsequently, in the interpolator 7, an interpolation value for a thinned-out pixel is prepared on the basis of non-thinned-out pixels. Similarly, in the interpolator 8, another interpolation value for that thinned-out pixel is prepared on the basis of the non-thinned-out pixels. Two different interpolation values obtained from the interpolators 7 and 8 are subtracted from a value of the thinned-out pixel (pixel to be interpolated) at the subtractors 9 and 10, respectively, to provide two difference values (interpolation errors). The two interpolation errors produced from the subtractors 9 and 10 are compared in magnitude by means of the comparator 11, which in turn selects one interpolator 7 or 8 that preduces a smaller interpolation error. The interpolator selected by the comparator 11 is represented by a coded word for means of one bit which is prepared by means of the coding circuit 12. For example, the coded word for means is "0" when the output signal of the interpolator 7 is selected and conversely it is "1" when the output signal of the interpolator 8 is selected. Because of two kinds of interpolators used in this embodiment, the coded word can be of one bit (without any redundancy but for three or more different interpolators used, the coded word must obviously be of two or more bits. The coded word for means thus obtained from the coder 12 is superimposed on one of the non-thinned-out pixels by means of the superimposition circuit 13 and then transmitted. The superimposition is effected in such a manner that when the least significant bits of values of two successive non-thinned-out pixels are exclusive-ORed, the least significant bit of value of the trailing pixel is changed to ensure that the exclusive-OR result or sum can coincide with the coded word. The non-thinned-out pixel thus superimposed with the coded word for means is transmitted from a sub-Nyquist sampling encoder to a sub-Nyquist sampling decoder through a transmission medium. In the separator 16, the least significant bits of values of the two successive non-thinned-out pixels are exclusive-ORed so that the coded word can be extracted. Then, the switching circuit 17 responds to the thus extracted coded word to select one of interpolation values obtained from the interpolators 14 and 15. The interpolation value selected by the switching circuit 17 is inserted between the non-thinned-out pixels by means of the insertion circuit 18. In this manner, according to this embodiment, the interpolation value obtained from the interpolator producing a smaller interpolation error can always be selected.

Figure 5:
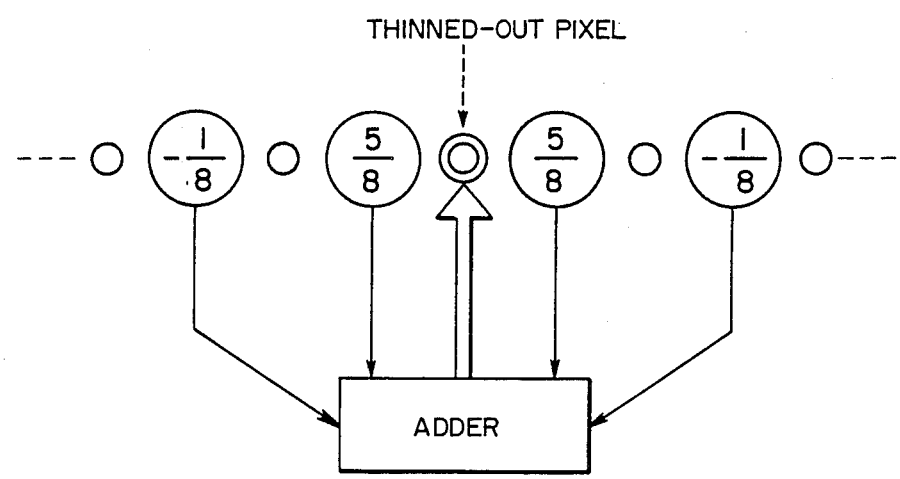
FIG. 5 is a diagram useful in explaining a filter of an interpolator used in the first embodiment.

Illustrated in FIG. 5 is an example of the interpolator which is a low-pass filter used for the horizontal direction. In the illustration, a larger circle filled in with a numeral represents a non-thinned-out pixel and a smaller circle represents a thinned-out pixel. The non-thinned-out pixels are added with weight values as shown in FIG. 5 to provide an interpolation value for a thinned-out pixel indicated by a double circle in FIG. 5. When this filter circuit is used for the vertical direction, it can act as a vertical interpolation filter.

The superimposition circuit in the present embodiment utilizes the exclusive-OR sum of values of the non-thinned-out pixels but the superimposition may be effected in other various ways. For example, the coded word may be transmitted independently of the values of non-thinned-out pixels.

Figure 6:
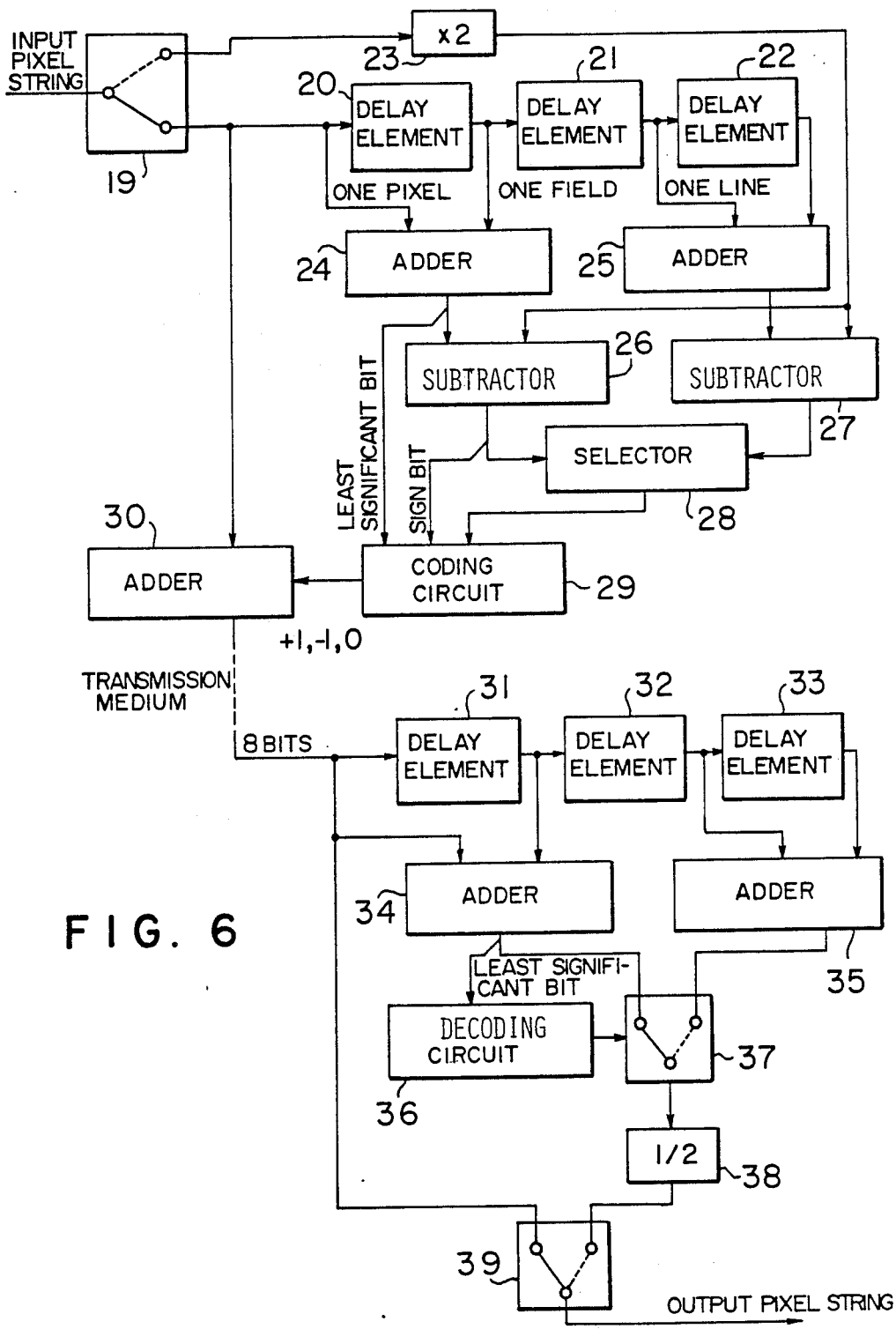
FIG. 6 is a block diagram illustrating a sub-Nyquist sampling encoder and decoder according to a second embodiment of the invention.

Referring to FIG. 6, a second embodiment of the sub-Nyquist sampling encoder and decoder is directed to a more specified application. In this embodiment, the input signal is a sampled television signal which forms a pixel string as the scanning proceeds. The sub-Nyquist sampling encoder and decoder diagrammatically shown in FIG. 6 is generally comprised of an encoder including components 19 through 30 and a decoder including components 31 through 39. There are seen in FIG. 6 a thin-out circuit 19 for separating an input pixel string into thinned-out pixels and non-thinned-out pixels, delay elements 20 and 31 for one-pixel delay, delay elements 21 and 32 for one-field delay, delay elements 22 and 33 for one-line delay, a multiplier 23 adapted to double the value of a thinned-out pixel by one bit shifting the pixel value, adders 24, 25, 34 and 35 for predicting a doubled interpolation value, subtractors 26 and 27 for calculating the difference between doubled thinned-out pixel value and doubled predictive interpolation value, a selector 28 responsive to output signals of the subtractors 26 and 27 to produce a data signal of one bit, a coding circuit 29 responsive to a positive or negative sign bit signal delivered out of the subtractor 26, an output signal of the selector 28 and the least significant bit of an output signal of the adder 24 to produce a signal indicative of "+1", "0" or "−1", an adder 30 for superimposing the output signal of the coding circuit 29 on a value of a non-thinned-out pixel, a decoding circuit 36 responsive to the sum of the least significant bits of values of non-thinned-out pixels to produce a signal which selects one of the interpolation means, a switching circuit 37 responsive to the output signal of the decoding circuit 36 to switch interpolation values, a divider 38 adapted to halve a value selected by the switching circuit 37 by one bit shifting the selected value, and an insertion circuit 39 for inserting the thinned-out pixel into a non-thinned-out pixel string. The sub-Nyquist sampling encoder and decoder constructed as above operates as will be described below with reference to FIG. 6 along with FIG. 2.

Thinned-out pixels as represented by smaller hatched circle and non-thinned-out pixels as represented by larger blank circle in FIG. 2 are decided by means of the thin-out circuit 19 in FIG. 6. When a pixel indicated at X in FIG. 2 is thinned out with the sub-Nyquist sampling encoder and decoder shown in FIG. 6, a coded word is superimposed on a non-thinned-out pixel indicated at R in FIG. 2 in order to instruct selection of interpolation means. In this operation, the adder 24 receives the pixel R and a pixel L produced from the delay element 20, the adder 25 receives a pixel B produced from the delay element 21 and a pixel A produced from the delay element 22, and the pixel X is delivered out of the multiplier 23. Then, the selector 28 can receive the following two input signals:

Horizontal error: $2 \times E(X) - E(L) - E(R)$
Vertical error: $2 \times E(X) - E(A) - E(B)$
where $E(X)$, $E(R)$, $E(L)$, $E(A)$ and $E(B)$ represent values of the pixels X, R, L, A and B, respectively.

The selector 28 receiving the above two signals produces "0" when an absolute value of the horizontal error is larger than an absolute value of the vertical error and produces "1" in the other case. The coding circuit 29 receives three bits in total including the output signal of the selector 28, the sign bit indicative of positive or negative of the horizontal error and the least significant bit of the output signal of the adder 24 (representing the exclusive-OR sum of the least significant bits of the pixels R and L received by the adder 24) and delivers out the coded word for interpolation means which assumes "+1", "−1" or "0" in accordance with data enumerated in Table 1.

TABLE 1

| Output of selector 28 | The least significant bit of adder 24 | Output sign of subtractor 26 | Output of coding circuit 29 |
|---|---|---|---|
| 0 | 0 | + | +1 |
| 0 | 0 | − | −1 |
| 0 | 1 | + | 0 |
| 0 | 1 | − | 0 |
| 1 | 0 | + | 0 |
| 1 | 0 | − | 0 |
| 1 | 1 | + | +1 |
| 1 | 1 | − | −1 |

The adder 30 responds to the coded word to add it to the pixel value $E(R)$ and transmit the resulting pixel R. The pixel X thinned out in the manner described above is interpolated in the sub-Nyquist sampling decoder as will be described below. In the decoder shown in FIG. 6, the delay element 31 receives the pixel R and delivers the pixel L, the delay element 32 delivers the pixel B and the delay element 33 delivers the pixel A. The decoding circuit 36 then responds to the least significant bit of the output signal of the adder 34 to produce the exclusive-OR sum of the least significant bits of the pixels R and L which are horizontally adjacent to the interpolated pixel. The switching circuit 37 is so controlled as to select the output signal of the adder 34 if the resulting exclusive-OR sum is "0" and to select the output signal of the adder 35 if the resulting exclusive-OR sum is "1". The output signal of the switching circuit 37 is halved by means of the divider 38 to provide the value of the pixel X which is inserted into the position preceding the pixel L.

In this manner, according to this embodiment, one of the horizontal and vertical directions in which the interpolation error is minimized is selected for the purpose of interpolation of the thinned-out pixel. The direction in which the interpolation is effected is determined by the exclusive-OR sum of the least significant bits of data of the pixels horizontally adjacent to the pixel to be interpolated and accordingly, in the event that the direction suited for the interpolation can not be obtained from the input values by themselves in the sub-Nyquist sampling encoder, the pixel values are forcibly changed by one level. This level change is subject to positive or negative of the horizontal error and causes the pixel values to approach the value of the thinned out pixel.

Accordingly, the superimposition of the coded word used for selecting the interpolation means is by itself prone to a noise of one level. However, this noise can be canceled through the pixel interpolation so as to be suppressed as a whole when the horizontal direction is selected and when the vertical direction is selected, its level change is visually inappreciable.

To conclude, the direction for interpolation is never misled and adaptive interpolation can be performed and besides, in the present embodiment the horizontal resolution and vertical resolution of the video signal can be conserved completely. The coded word "+1", "−1" or "0" is generated by the particular coding in the present embodiment but it may be generated in other various ways, for example, by using values of other pixels than the two pixels adjacent to the thinned-out pixel.

The present embodiment takes advantage of the field correlation but selection of the vertical direction in which the interpolation error is increased can be inhibited adaptively for moving pictures.

A filter of higher degree may be applied to the interpolation filter of the invention.

Figure 7:
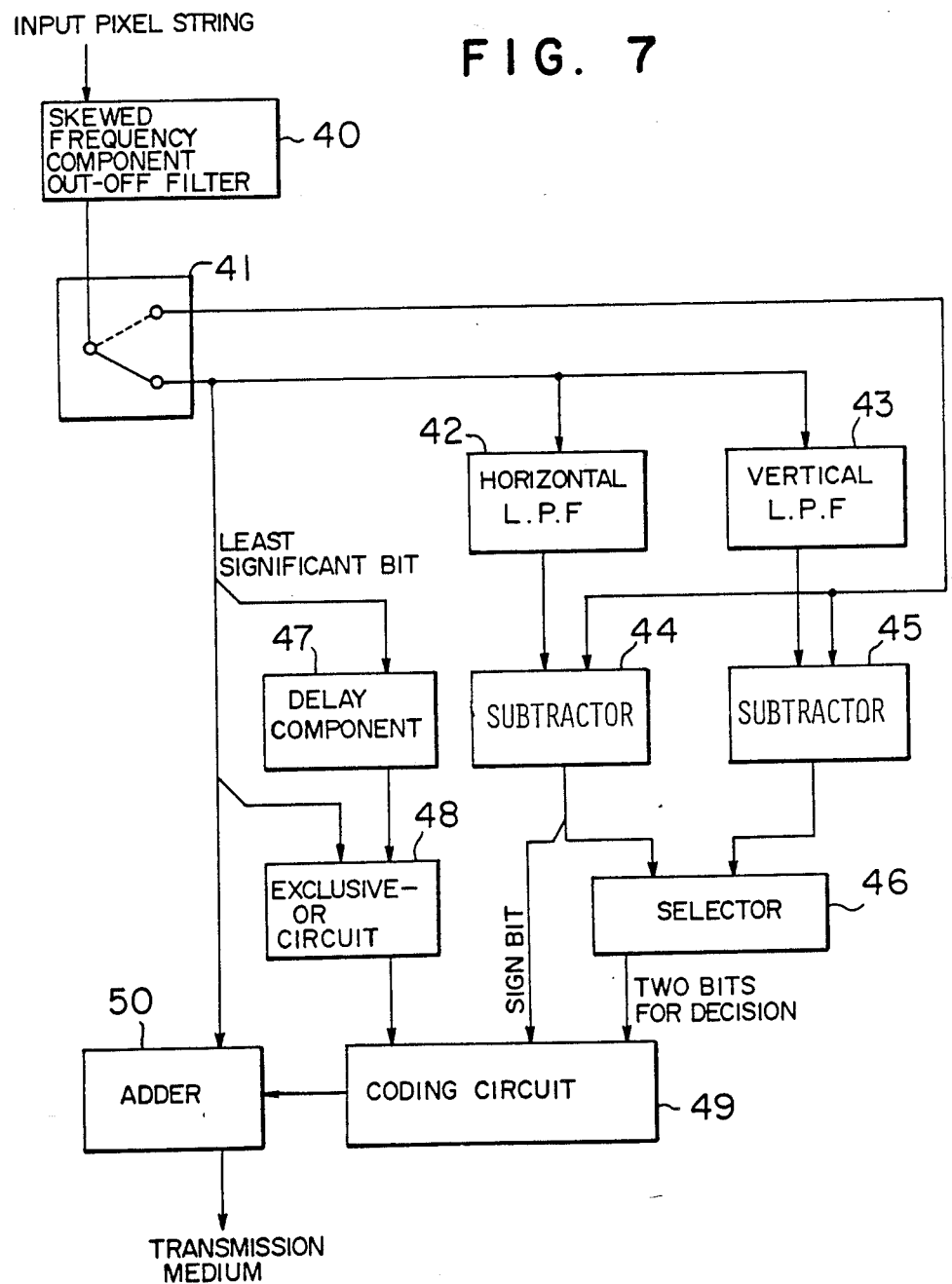
FIG. 7 is a block diagram illustrating a sub-Nyquist sampling encoder according to a third embodiment of the invention.

Referring to FIG. 7, there is illustrated a sub-Nyquist sampling encoder according to a third embodiment of the invention. As diagrammatically shown in schematic block form in FIG. 7, the encoder comprises a filter 40 for cutting off skewed frequency components of a video signal, a thin-out circuit 41, horizontal and vertical interpolation filters 42 and 43, a subtractor 44 for calculating the difference (interpolation error) between a horizontal interpolation value produced from the interpolation filter 42 and a value of a thinned-out pixel (pixel to be interpolated), a subtractor 45 for calculating the difference between a vertical interpolation value produced from the interpolation filter 43 and the value of the thinned-out pixel, a selector 46 responsive to output signals of the subtractors 44 and 45 to produce a decision signal of two bits, a delay element 47 for one pixel delaying the least significant bit of a value of a non-thinned-out pixel, an exclusive-OR circuit 48 for exclusive-ORing the least significant bit of a value of a currently occurring non-thinned-out pixel and the least significant bit of the value of the non-thinned-out pixel which one pixel precedes the currently occurring non-thinned-out pixel by being delayed by means of the delay element 47, a coding circuit 49 responsive to four bits in total including the decision signal of two bits produced from the selector 46, a sign bit signal of one bit produced from the subtractor 44 and the exclusive-OR sum of one bit delivered out of the exclusive-OR circuit 48 to produce a coded word for interpolation means, and an adder 50 for adding the coded word for interpolation means obtained from the coding circuit 49 to the value of the non-thinned-out pixel.

The encoder of this embodiment operates substantially in the same manner as the encoders of the previous two embodiments, with the exception of the operation of the skewed frequency component cut-off filter 40, selector 46 and coding circuit 49 which will be described below in greater detail.

Figure 8:
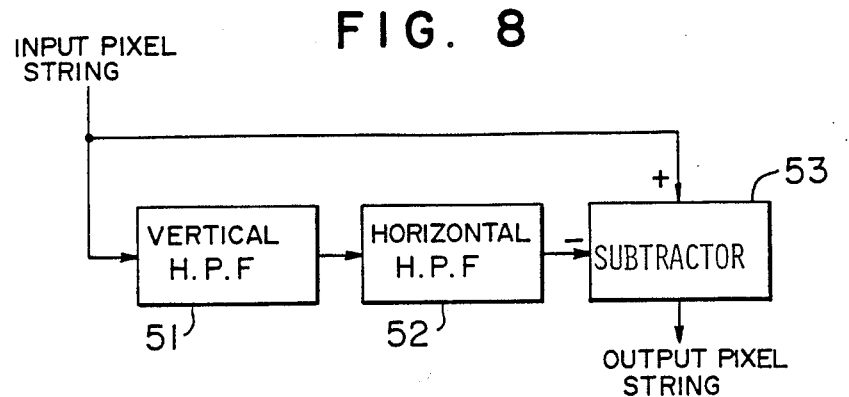
FIG. 8 is a block diagram illustrating a skewed frequency component cut-off filter.
Figure 9:
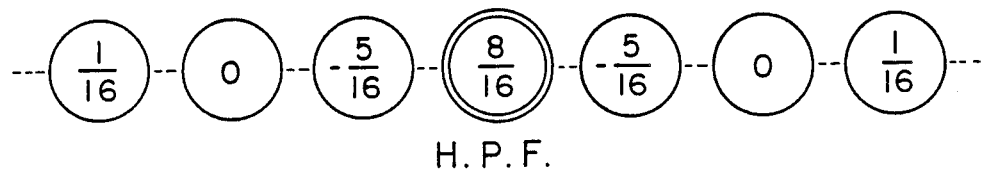
FIG. 9 is a diagram for explaining a high-pass filter used in the skewed frequency component cut-off filter.
Figure 10:
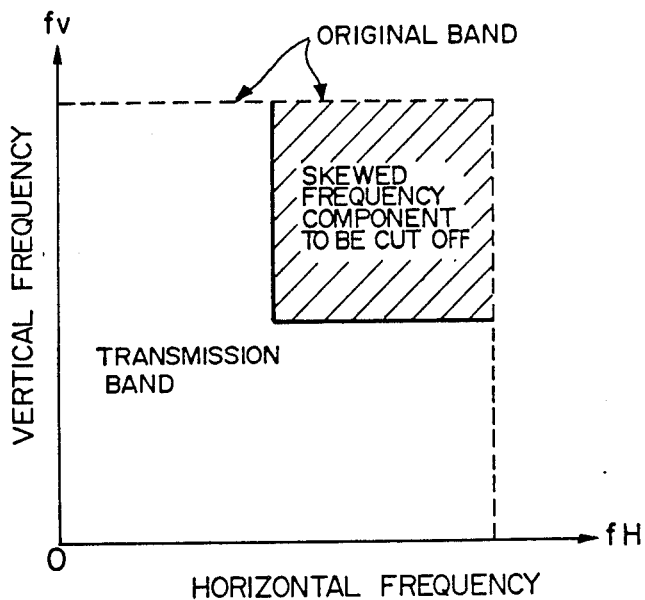
FIG. 10 is a graphical representation for explaining a frequency band which is eliminated by the skewed frequency component cut-off filter.

In the FIG. 7 encoder, an input video signal is first passed through the skewed frequency component cut-off filter 40, with the view of eliminating an aliasing noise or distortion due to the thin-out operation. Exemplarily, this filter is constructed as shown in FIG. 8. More particularly, the filter 40 diagrammatically shown in FIG. 8 comprises a vertical high-pass filter 51, a horizontal high-pass filter 52 and a subtractor 53 for subtracting a value of a pixel passed through the two filters of vertical high-pass filter 51 and horizontal high-pass filter 52 from the original video signal. By subtracting the component passed through the horizontal and vertical high-pass filters from the original video signal in this manner, the filter for eliminating only the skewed frequency component can be constructed. FIG. 9 shows an example of the high-pass filter which is applied to the FIG. 8 filter to provide a skewed frequency component cut-off filter having a characteristic as shown in FIG. 10.

To describe the selector 46 and coding circuit 49, it is assumed that an interpolation value produced from the horizontal interpolator 42 is Eh, an interpolation value produced from the vertical interpolator 43 is Ev and the value of a thinned-out pixel X (see FIG. 2) is represented by E(X). Then, an interpolation error (horizontal error) obtained from the subtractor 44 and an interpolation error (vertical error) obtained from the subtractor 45 are expressed as follows:
Horizontal error: E(X)−Eh
Vertical error: E(X)−Ev.
The selector 46 receives the above two signals to produce "00" when an absolute value of the horizontal error minus an absolute value of the vertical error is larger than 2, "01" when an absolute value of the vertical error minus an absolute value of the horizontal error is larger than 2, and "10" or "11" in the other case. In this embodiment, the output signal of the selector 46 is of two bits. The least significant bit of the one pixel preceding, non-thinned-out pixel delivered out of the delay element 47 and the least significant bit of the currently occurring non-thinned-out pixel are exclusive-ORed in the exclusive-OR circuit 48 and the exclusive-OR sum is delivered out of the circuit 48. It should be understood that these two pixels occur on the opposite sides of the thinned-out pixel for which the interpolation value is to be extracted. The coding circuit 49 receives four bits in total including the output signal of one bit from the exclusive-OR circuit 48, the output signal of two bits from the selector 46 and the sign bit signal of one bit indicative of positive or negative of the horizontal error produced from the subtractor 44 and produces a coded word of "+1", "−1" or "0" in accordance with data enumerated in Table 2. The output signal (coded word for interpolation means) thus obtained from the coding circuit 49 is added to the non-thinned-out pixel by means of the adder 50 and transmitted therefrom.

TABLE 2

| Output of selector 46 | Output of exclusive-OR circuit 48 | Output sign of subtractor 44 | Output of coding circuit 49 |
|---|---|---|---|
| 0 0 | 0 | + | +1 |
| 0 0 | 0 | − | −1 |
| 0 0 | 1 | + | 0 |
| 0 0 | 1 | − | 0 |
| 0 1 | 0 | + | 0 |
| 0 1 | 0 | − | 0 |
| 0 1 | 1 | + | +1 |
| 0 1 | 1 | − | −1 |
| · 1 X | X | X | 0 |

In Table 2, "X" represents arbitrary data.

In this embodiment having the construction described as above, the coded word is never superimposed when the difference between horizontal error and vertical error is less than two levels, that is, when the output signals of the two interpolation filters are substantially equal to each other. Accordingly, in addition to the performance achieved by the first and second embodiments, this embodiment can afford to ensure that at low band area where the change of level in the video signal is small and flat, the value of non-thinned-out pixels can be transmitted in the form of the original value without changing pixel data to thereby conserve the flatness of the video signal. The present embodiment is further advantageous in that thanks to the provision of the pre-filter, the skewed high video spatial frequency component which invites interpolation errors even when the horizontal interpolation and vertical interpolation are effected adaptively can be attenuated and visual disturbance due to aliasing of the skewed high band component of the spatial frequency can be prevented. The pre-filter may obviously be constructed in other ways than described in connection with the present embodiment. Although the criterion for the decision by the selector is exemplarily set to be "2" in the present embodiment, it may take different values. The thinned-out pixel may be interpolated in other ways than described in this embodiment. The kind and the number of the interpolation means are not limitative but may be changed purposively. Further, the teachings of the present invention may be applicable to other information than the video information, such as sound information.

We claim:

1. A sub-Nyquist sampling encoder comprising:
means for thinning out pixels from a sampled video data signal in accordance with a predetermined rule;
a plurality of interpolation means for interpolating a pixel thinned out by said thin-out means by using non-thinned-out pixels adjacent to the thinned-out pixel;
selection means for comparing a sampled value of said thinned-out pixel with a plurality of interpolation values produce from said plurality of interpolation means and selecting one of said plurality of interpolation means;
coding means responsive to an output signal of said selection means to produce a coded word indicating which interpolation means is selected by said selection means; and
superimposition means for superimposing said coded word on a non-thinned-out pixel.

2. A sub-Nyquist sampling encoder according to claim 1 wherein said plurality of interpolation means comprise a horizontal low-pass filter and a vertical low-pass filter.

3. A sub-Nyquist sampling encoder according to claim 1 wherein said superimposition means changes the value of the pixel to be superimposed in such a manner that the interpolation error is not increased by superimposing said coded word on said pixel.

4. A sub-Nyquist sampling encoder according to claim 1 wherein said superimposition means does not effect the superimposition of said coded word when the value of the pixel to be interpolated falls within the filter pass band common to all of said interpolation means.

5. A sub-Nyquist sampling encoder according to claim 4 wherein said superimposition means does not effect the superimposition of said coded word when the difference between the plurality of interpolation values is less than a predetermined value.

6. A sub-Nyquist sampling encoder according to claim 1 wherein said superimposition means superimposes said coded word on the least significant bit of a non-thinned-out pixel.

7. A sub-Nyquist sampling encoder according to claim 6 wherein said superimposition means effects the superimposition in such a manner that said coded word is represented by information as to whether the least significant bits of values of two non-thinned-out pixels are equal to each other.

8. A sub-Nyquist sampling encoder according to claim 1 wherein said superimposition means superimposes said coded word on a non-thinned-out pixel adjacent to the interpolated pixel.

9. A sub-Nyquist sampling encoder according to claim 1 further comprising pre-filtering means for cutting off the skewed frequency component of the video signal in advance of the extraction of interpolation values.

10. A sub-Nyquist sampling encoder according to claim 9 wherein said pre-filtering means comprises a skewed frequency component pass filter for producing an output signal representative of the product of horizontal high-pass filtering and vertical high-pass filtering and a subtractor for subtracting said product signal from the original video signal so as to cut off said skewed frequency component.

11. A sub-Nyquist sampling encoder as in claim 1, wherein said coding means comprises means for producing a code word having no redundant information and indicating which interpolating means is selected by said selection means.

12. A sub-Nyquist sampling encoder and decoder comprising:
an encoder including means for thinning out pixels from a sampled video data signal in accordance with a predetermined rule, a plurality of first interpolation means for interpolating a pixel thinned out by said thin-out means by using non-thinned-out pixels adjacent to the thinned-out pixel, selection means for comparing a sampled value of said thinned-out pixel with a plurality of interpolation values produced form said plurality of first interpolation means and selecting one of said plurality of first interpolation means, coding means responsive to an output signal of said selection means to produce a coded word indicating which first interpolation means is selected by said selection means, and superimposition means for superimposing said coded word on a non-thinned-out pixel; and
a decoder, responsive to information transmitted from said encoder, including a plurality of second interpolation means having the same respective characteristics as those of corresponding ones of said first interpolation means of said encoder, separation means for separating said coded word from the non-thinned-out pixel, and insertion means for responding to said coded word to select one of said plurality of second interpolation means and inserting an interpolation value obtained from the selected second interpolation means into a position between non-thinned-out pixels.

13. A sub-Nyquist sampling encoder and decoder according to claim 12 wherein said superimposition means does not effect the superimposition of said coded word when the value of the pixel to be interpolated falls within the filter pass band common to all of said first interpolation means.

14. A sub-Nyquist sampling encoder and decoder according to claim 13 wherein said superimposition means does not effect the superimposition of said coded word when the difference between the plurality of interpolation values is less than a predetermined value.

15. A sub-Nyquist sampling encoder and decoder as in claim 11, wherein said superimposition means superimposes said coded word on the least significant bit of a non-thinned-out pixel in such a manner said coded word is represented by information as to whether the least significant bits of values of two non-thinned-out pixels are equal to each other.

16. A sub-Nyquist sampling encoder and decoder according to claim 12 further comprising pre-filtering means for cutting off the skewed frequency component of the video signal in advance of the extraction of interpolation values.

17. A sub-Nyquist sampling encoder and decoder according to claim 16 wherein said pre-filtering means comprises a skewed frequency component pass filter for producing an output signal representative of the product of horizontal high-pass filtering and vertical high-pass filtering and a subtractor for subtracting said product signal from the original video signal so as to cut off said skewed frequency component.

* * * * *